(No Model.) 2 Sheets—Sheet 1.

J. B. ROOT.
SPIRAL PIPE MACHINE.

No. 346,612. Patented Aug. 3, 1886.

Witnesses:
Henry Eisling
Robert T. Gaylord

Inventor
John B. Root
by Saml. A. Duncan atty (No Model.) 2 Sheets—Sheet 2.

J. B. ROOT.
SPIRAL PIPE MACHINE.

No. 346,612. Patented Aug. 3, 1886.

Witnesses:
Henry Eisley
Robt. F. Gaylord

Inventor
John B. Root
by Paul A. Duncan
atty.

UNITED STATES PATENT OFFICE.

JOHN B. ROOT, OF PORT CHESTER, NEW YORK.

SPIRAL-PIPE MACHINE.

SPECIFICATION forming part of Letters Patent No. 346,612, dated August 3, 1886.

Application filed March 4, 1886. Serial No. 194,084. (No model.)

*To all whom it may concern:*

Be it known that I, JOHN B. ROOT, of Port Chester, in the county of Westchester and State of New York, have invented certain new and useful Improvements in Spiral-Pipe Machines; and I hereby declare the same in the following full, clear, and exact description thereof, which will enable those skilled in the art to which they belong to make and use the same.

These improvements relate to pipe-machines in which a continuous blank is wound spirally into cylindrical shape, with its edges overlapping, the edges being heated just before they come in contact and then welded together. The mechanism for accomplishing this result forms the subject of various patents heretofore granted to me, and of applications for patents now pending, and it is not therefore necessary to describe such mechanism in full.

The particular form of machine to which the present improvements are applied, as shown by the accompanying drawings, is that which forms the subject of an application for patent filed by me July 18, 1884, numbered 137,996, and allowed February 4, 1885, and renewed November 9, 1885, numbered 182,238, and allowed November 14, 1885, and again renewed July 2, 1886, numbered 206,971, and allowed July 9, 1886.

This machine consists, in general, of feeding or blank-advancing mechanism borne on a spirally-reciprocating shaft, and adapted to clamp the blank and force it forward through a circular former, this clamping mechanism also serving to weld the edges of the blank together, such edges being heated by a blow-pipe furnace arranged close to the clamping and shaping mechanism and in the path of the blank.

The present improvements consist in combining with the clamping mechanism of said machine hammering devices also supported on the spirally-reciprocating shaft and operated by said clamping mechanism, so that as the blank is clamped and carried forward its heated overlapping edges are operated upon by said hammering mechanism and welded together.

Figure 1:
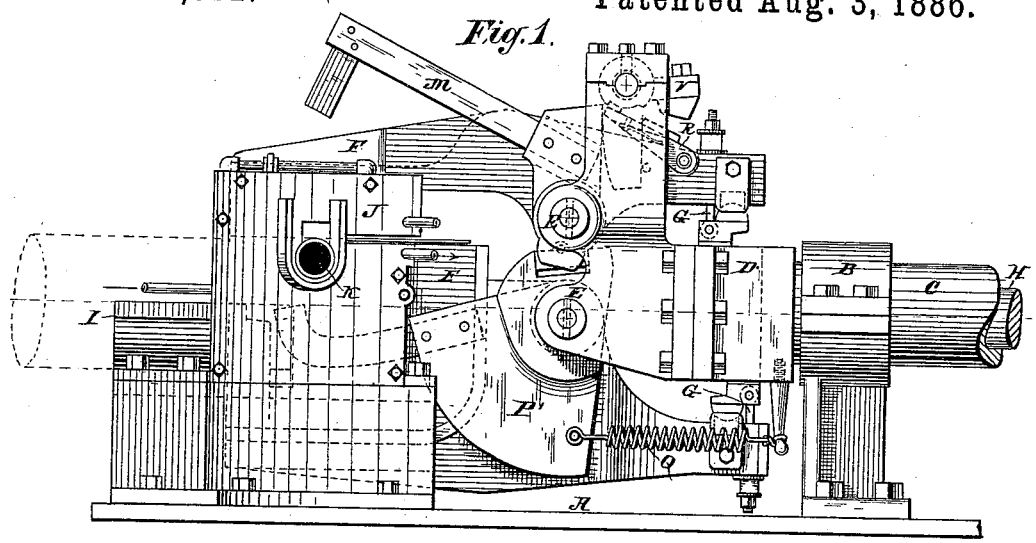
Figure 2:
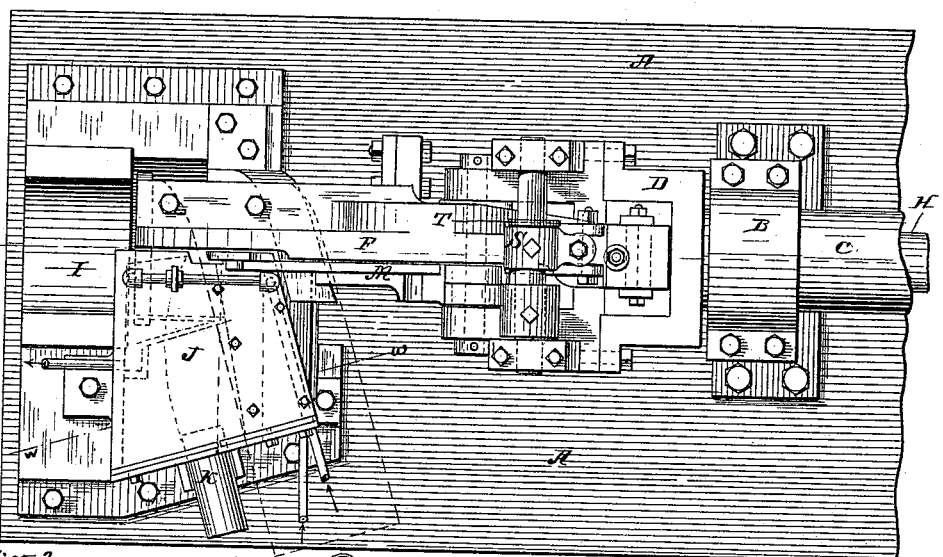
Figure 3:
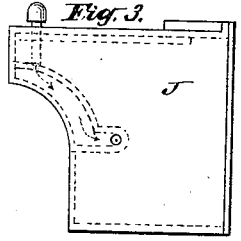
Figure 4:
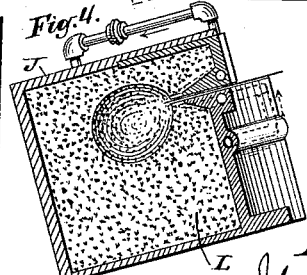
Figure 5:
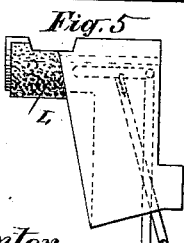
Figure 6:
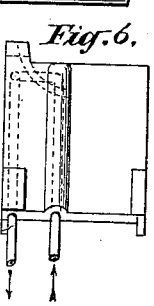
Figure 7:
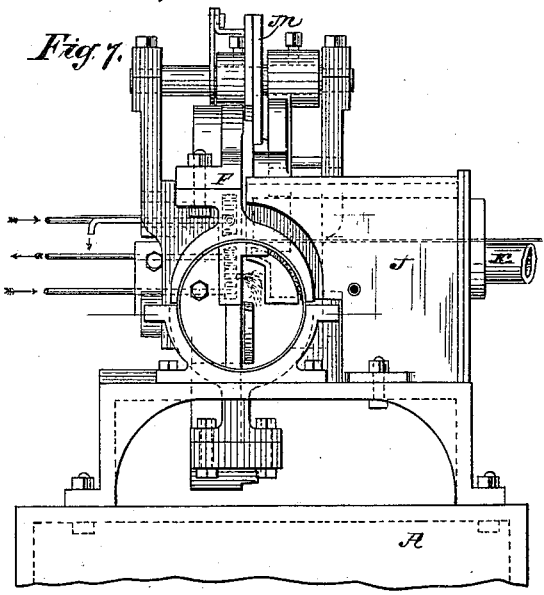
Figure 10:
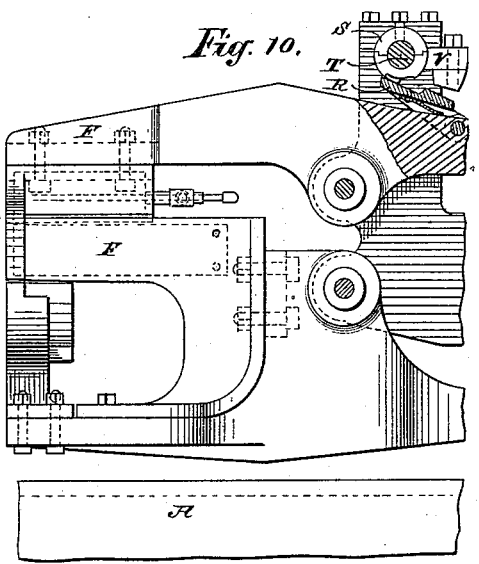
Figure 8:
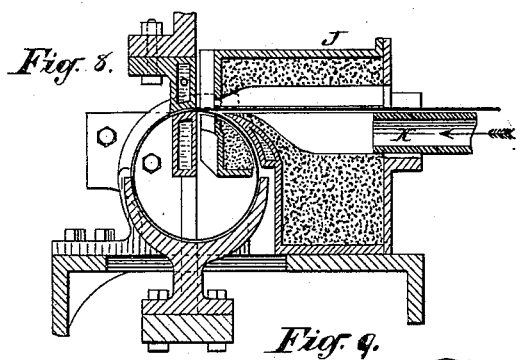
Figure 11:
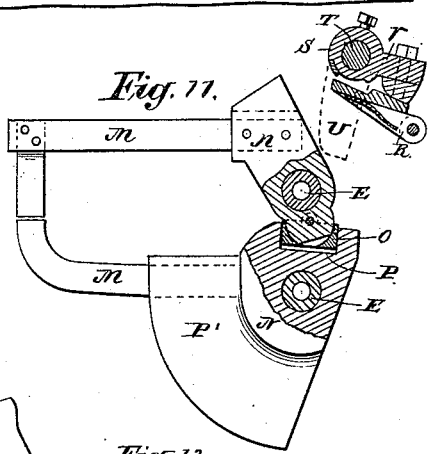
Figure 9:
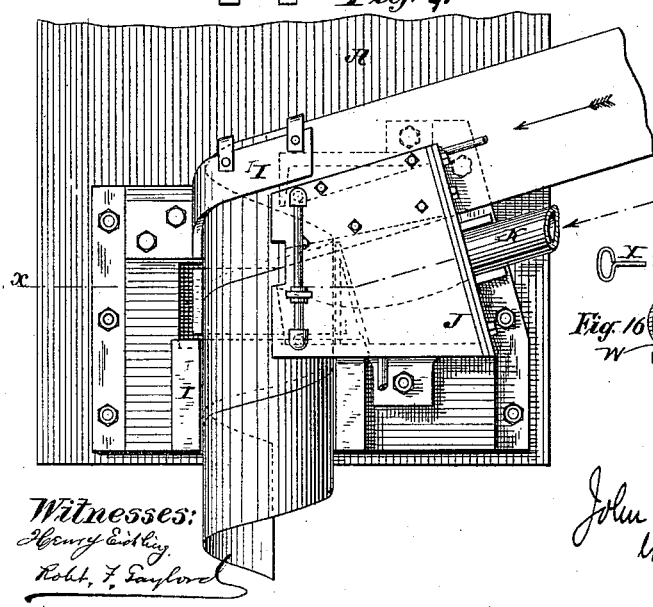
Figures 12, 13:
Figures 14, 16:
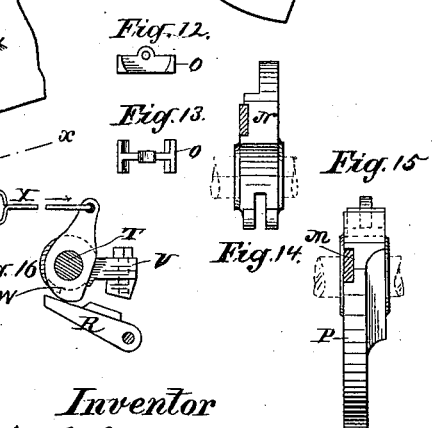
Figure 15:
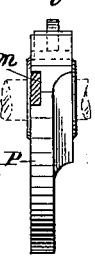

In the drawings, Figure 1 is an elevation view of that part of the machine that operates directly upon the blank—that is, the mechanism upon one end of the above-described spirally-reciprocating shaft. Fig. 2 is a plan view of the same. Fig. 3 is an elevation of the furnace structure from the left of Fig. 2. Fig. 4 is a section of the same on plane *w w*. Fig. 5 is a plan view of the right hand, Fig. 4, part of the same. Fig. 6 is an elevation view, from the right hand, of the part shown in Fig. 5. Fig. 7 is an elevation view of the machine from the left of Fig. 1. Fig. 8 is a cross-section of the same on plane *x x* of Fig. 9, which is a plan view of the furnace and former with a blank in the position of being shaped. Fig. 10 is an elevation of the clamping-jaws in their closed position with the hammers removed. Fig. 11 is a like view of the hammers with the clamping-jaws removed. Figs. 12 and 13 are a side and a top view of the gib which connects the hammers. Figs. 14 and 15 are an elevation view of the upper and of the lower hammer from the left of Fig. 11, with the heads of the hammers cut away; and Fig. 16 is a cross-section of the hammer-driving shaft close to the hammer-shipping mechanism.

Referring to these views in detail, A is the base of the machine, and B is a standard rising therefrom and supporting in a suitable bearing one end of the shaft C. This shaft (by suitable mechanism attached to the end not shown) has a combined longitudinal and circular motion from its present position forward, and then back—that is, it has a short spirally-reciprocating motion corresponding to the inclination that the blank has when wound into cylindrical form. This shaft carries on its end a head or frame, D, in which is hung on bearings E the pinchers F, which pinchers extend back from their bearings, and are operated to close and open through pitman-rods G, connected with cranks or cams on the shaft H within the pincher-shaft C, this shaft H revolving within the pincher-shaft and having the same longitudinal reciprocating motion.

I I is the former, through which the blank is forced by the forward motion of the pinchers, the pinchers loosing the blank as they return and the blank being held in the former.

J is the furnace for heating the edges of the blank, it being constructed with a blow-pipe, K, the flame of which is confined to the edges of the blank at and near the point of their juncture, where the pinchers take hold of them, by suitably-arranged fire-brick L, or other refractory material, as best seen in Figs. 4 and 8.

The parts thus described are in general construction the same as those described in full in said application. The description of the new features will now follow.

M represents the hammers of the hammering mechanism. These hammers are secured to blocks N, hung on the same axis, E, as the pinchers F, and extend forward, so when operated they strike upon the overlapping heated edges of the blank close to where the pinchers take hold of the same. The hammers are connected, so as to operate together, by the sliding gib O, which is pivoted to the upper block, N, and slides in a groove, P, in the lower hammer-block. By this arrangement the lower hammer, which projects under the blank, where it has but little room, has a shorter swing, corresponding, however, with the long swing of the upper hammer, and so weighted, as seen at P', as to deliver a blow of the same power as the upper hammer. The hammers are held in the open position shown in the drawings by the spring Q, attached to the weight P' and to the head D. The hammers are operated by the spring-pawl R, which is hinged to the upper pincher and bears on the notched sleeve S on the shaft T, which has two bearings in the head D, just above the bearings of the pinchers and hammers, and carries the hammer-actuating arm U and the tripping-arm V. When the pinchers move to close upon the blank, the pawl R is caused to engage with and partially revolve the sleeve S and shaft T, Fig. 10, so that the arm U, bearing against the upper hammer-block, swings the hammers together, Fig. 11, thus delivering a welding-blow upon the heated portions of the edges of the blank at the point close to where the pinchers grasp them. When the hammers have nearly come together, and have received their full impulse, the tripping-arm V comes in contact with the pawl R and disengages it from the sleeve S, so that when the hammers have struck the blank they are at once returned to their retracted position by the spring Q, and the upper hammer, bearing against the arm U, returns such arm and the sleeve S to their first position.

On the shaft T is a cam, W, to the arm of which is attached the actuating-rod X, extending to the position of the operator at the front end of the machine. This cam revolves on the shaft T, and is arranged in such position that it is directly over the pawl R, so that when revolved the highest part of its periphery will bear upon the pawl R and depress it so that it cannot engage with the sleeve S. By this mechanism the action of the hammers is entirely under the control of the operator of the machine, who can at any time while the clamping-jaws are working call them into operation to strike one or more blows.

What is claimed as new is—

1. In a pipe-machine, the combination of spirally-reciprocating blank-clamping mechanism and a hammering mechanism arranged to operate upon the overlapping edges of the blank for the purpose of welding the same together.

2. In a pipe-machine, the combination of spirally-reciprocating blank-clamping mechanism and a hammering mechanism reciprocating therewith, and arranged to operate upon the overlapping edges of the blank to weld the same together.

3. In a pipe-machine, the combination of spirally-reciprocating blank-clamping mechanism, hammering mechanism reciprocating therewith, and a blank-heating furnace constructed and arranged to heat the overlapping edges of the blank at or near their point of joining.

4. In combination, the spirally-reciprocating shaft C, the clamping-jaws F, mounted thereon, the shaft H, for operating said jaws, the hammers M and their connections by which they are operated from said shaft H, and the spring Q, substantially as described.

5. In combination, the spirally-reciprocating shaft C, the clamping-jaws F, mounted thereon, and one carrying pawl R, the shaft H, for operating said jaws, the hammers M, the spring Q, and the notched sleeve S with its tripping-arm V, substantially as set forth.

6. In combination with the pinching-jaws C and the hammers M and the mechanism for operating the same, the cam W, for holding the pawl R out of engagement with the sleeve S, substantially as set forth.

7. In combination with the hammers M and the mechanism for operating the same, the sliding gib O, connecting the two hammers, whereby the lower hammer has a shorter swing than the upper one, substantially as set forth.

JOHN B. ROOT.

Witnesses:
ROBT. F. GAYLORD,
ROBT. P. HARLOW.